(12) United States Patent
Martyak et al.

(10) Patent No.: US 7,452,486 B2
(45) Date of Patent: Nov. 18, 2008

(54) ZINC LANTHANIDE SULFONIC ACID ELECTROLYTES

(75) Inventors: Nicholas Michael Martyak, Doylestown, PA (US); Martin Nosowitz, Paoli, PA (US)

(73) Assignee: Arkema Inc., Philadelphia, PA (US)

( * ) Notice: Subject to any disclaimer, the term of this patent is extended or adjusted under 35 U.S.C. 154(b) by 484 days.

(21) Appl. No.: 10/555,361

(22) PCT Filed: May 13, 2004

(86) PCT No.: PCT/US2004/014900

§ 371 (c)(1),
(2), (4) Date: Nov. 2, 2005

(87) PCT Pub. No.: WO2004/105051

PCT Pub. Date: Dec. 2, 2004

(65) Prior Publication Data

US 2007/0051925 A1    Mar. 8, 2007

Related U.S. Application Data

(60) Provisional application No. 60/471,654, filed on May 19, 2003.

(51) Int. Cl.
*H01B 1/00* (2006.01)
*H01B 1/02* (2006.01)
*H01M 4/02* (2006.01)
*H01M 4/36* (2006.01)
*H01M 4/42* (2006.01)

(52) U.S. Cl. .................... 252/500; 252/512; 252/518.1; 252/519.5; 205/64; 429/101; 429/105; 429/229

(58) Field of Classification Search ................. 252/500, 252/512, 518.1, 519.5; 429/101, 105, 229; 205/64
See application file for complete search history.

(56) References Cited

U.S. PATENT DOCUMENTS

| 2,525,942 | A | 10/1950 | Proell |
| 2,525,943 | A | 10/1950 | Proell |
| 4,639,298 | A | 1/1987 | Kreh et al. |
| 4,647,349 | A | 3/1987 | Kreh et al. |
| 4,670,108 | A | 6/1987 | Kreh et al. |
| 4,701,245 | A | 10/1987 | Kreh |
| 5,246,553 | A | 9/1993 | Harrison et al. |
| 5,783,059 | A | 7/1998 | Cavallotti et al. |
| 6,187,169 | B1 | 2/2001 | Gernon et al. |
| 2006/0272950 | A1 | 12/2006 | Martyak et al. |

FOREIGN PATENT DOCUMENTS

| EP | 0786539 A2 | | 7/1997 |
| JP | 11-200088 | | 7/1999 |
| WO | WO 03/017395 | * | 2/2003 |

OTHER PUBLICATIONS

Proell, et al, Monthly Review of the American Electroplaters Society,"Copper Plating in Alkanesulfonic Acid Baths," 1947, vol. 34, pp. 541-549.
Clarke, et al, "Introducing Cerium Based High Energy Redox Batteries," ESAT Conference, San Francisco, CA, Apr. 15-17, 2002, pp. 1-6.

* cited by examiner

*Primary Examiner*—Mark Kopec
*Assistant Examiner*—Jaison P Thomas
(74) *Attorney, Agent, or Firm*—Steven D. Boyd

(57) ABSTRACT

Disclosed are aqueous solutions for use in high energy, highly efficient electrical energy storage devices. The solutions contain (a) a high purity sulfonic acid with a low concentration of low valent sulfur compounds or higher valent sulfur compounds susceptible to reduction, (b) a metal or metals in an oxidized state that are capable of being reduced to the zero valent oxidation state, (c) a metal that is in an oxidized state that is incapable of being reduced to its metallic state and (d) optionally, a buffering agent and/or conductivity salts.

31 Claims, No Drawings

ZINC LANTHANIDE SULFONIC ACID ELECTROLYTES

This application claims the benefit of U.S. Provisional Application Ser. No. 60/471,654 filed May 19, 2003.

BACKGROUND OF THE INVENTION

1. Field of the Invention

The present invention relates to the use of high purity metal sulfonic acids for use in energy storage devices, methods for preparing high purity metal sulfonic acids electrolytes, methods for efficiently using the metal sulfonic acid solution and products formed by using such methods and solutions. More particularly, the invention provides sulfonic acid solutions that have high cathode efficiencies for 2B series metals such as zinc deposition processes, sulfonic acid solutions that affords high solubility to lanthanide series ions and sulfonic acid solutions that have low concentrations of low-valent sulfur compounds or higher valent sulfur compounds susceptible of reduction that are capable of producing an unwanted odor during electrolysis.

2. Prior Art

Electrochemical processes are used in many large-scale stationary energy device storage applications. The rating of an energy storage device is dependent upon the overall power supply and the discharge time. Power supply can vary from 1 kilowatt (1 kW) in metal-air type batteries to greater than 1 gigawatt (1 GW) in pumped hydro-type batteries. Discharge times may also vary from a fraction of a second to greater than several hours.

Improved reliability or power quality of energy storage devices may require virtually uninterrupted power supplies (UPS). Such electrical storage processes include capacitors, and super conducting magnetic energy storage devices. During a power interruption, these devices are used within fractions of a second to ensure an uninterrupted source of power.

Storage devices may also be used from a few seconds to several minutes in cases where the power is switched from one main power supply (e.g., a power grid) to another main power supply.

Electrical energy storage devices may also be used to provide cost savings to large users in times of limited available power. Such power devices provide sufficient electrical energy from minutes to hours in duration to meet peak energy demands, or to provide a reservoir of power for use in off-peak times.

The capability of the energy storage process and the accompanying power output is dependent upon the engineering design of the device, composition of the electrolytes used in such device and the type of power rating needed. There are several commercial energy storage processes available each with its own advantages and disadvantages. These include the polysulfide bromide battery (PSB), the vanadium redox battery (VRB), the zinc bromine battery (ZnBr), the sodium sulfide battery (NaS), lithium ion battery, compressed air energy storage (CAES), large-scale lead acid battery (LSLA), pumped hydro, E.C. capacitors and flywheel technologies.

There are three flow-type batteries, PSB, VRB and ZnBr. The PSB battery employs two sodium electrolytes, sodium bromide and sodium sulfide. The redox potential of this cell is about 1.5 V and the efficiency is approximately 75%. The VRB use two cell each containing vanadium. In one cell, $V^{+2}/V^{+3}$ is used and in the other, $V^{+4}/V^{+5}$. The redox voltage is about 1.4 to 1.6 V and the efficiency is slightly higher than the PSB battery, about 85%. The ZnBr redox potential is about 1.8 V yet the efficiency is only about 75%. All these flow-type batteries have relatively high power ratings and may be used in energy management type applications where supplemental power is needed over an extended period of time. All these flow-type batteries suffer from low energy density.

The NaS battery uses molten sulfur and molten sodium to produce a redox voltage of about 2 volts at an efficiency of approximately 88%. The main drawbacks to this type of battery are the high temperature, 300° C., necessary to keep the metals molten, safety concerns using these materials and high production costs.

The lithium-ion battery has efficiency near 100% and high energy density and long life cycles. Although useful for small-scale applications, the main drawback to large-scale use is the inherently high cost, about $600/kWh.

CAES plants are capable of producing power in the GW range with long power durations. However, the CAES plants are very expensive, on the order of ten of millions of dollars and take several years to build such a plant. The CAES plants are site-specific and may need natural gas as a fuel.

Recently, a new redox energy storage device was introduced by Electrochemical Design Associates, the Plurion Redox Battery. This battery uses mixed salts of zinc and cerium in methanesulfonic acid (MSA). The redox potential of this cell is an excess of 2 volts. This energy storage device based on zinc and cerium salts was discussed by B. J. Dougherty and co-workers at the Electrical Energy Storage Application and Technology meeting, 2002 EESAT meeting (http://www.sandia.gov/EESAT/). There is no mention of the composition of the cerium ion, (e.g., $Ce^{+3}$ or $Ce^{+4}$) in this paper.

MSA has been used in a variety of electrochemical process, most notably in electrodeposition (e.g., plating) applications. While offering advantages over other organic and mineral acids, MSA (and other sulfonic acids) and the purity and composition of the metal-sulfonate electrolyte must be uniquely balanced to ensure a quality metal coating and a high electrolytic efficient process.

The use of sulfonic acids in electrochemical applications, and in particular, MSA, is not new. Proell, W. A. in U.S. Pat. No. 2,525,942 claims the use of alkanesulfonic acid electrolytes in numerous types of electroplating. For the most part, Proell's formulations employed mixed alkanesulfonic acids of unspecified purity. In U.S. Pat. No. 2,525,942 Proell made specific claims for lead, nickel, cadmium, silver and zinc. In another U.S. Pat. No. 2,525,943, Proell specifically claims the use of alkanesulfonic acid based electrolytes in copper electroplating and the exact compositions and purity of the plating formulations were not disclosed. In a separate publication (Proell, W. A.; Faust, C. L.; Agruss, B.; Combs, E. L.; The Monthly Review of the American Electroplaters Society 1947, 34, 541-9) Proell describes preferred formulations for copper plating from mixed alkanesulfonic acid based electrolytes.

Martyak and co-workers in EP 0786539 A2 have discussed zinc deposition from MSA-based electrolytes. The acid electrolytes contained from about 5 grams per liter to about 175 grams per liter of the zinc-sulfonate salt. The pH described in this application claims the zinc sulfonate solutions operate best at a pH from about 2.0 or greater and preferably in the range from 3-5. The efficiency for zinc deposition is near 100% even at high current densities. Additives to the solution affected the quality of the zinc deposit. To minimize roughness in the zinc surface, it was necessary to use organic additives such as blocked and random co-polymers of alkylene oxides.

The use of cerium in sulfonic acids was the scope of inventions by Kreh and co-workers in U.S. Pat. Nos. 4,701,245 A1, 4,670,108 A1, 4,647,349 A1 and 4,639,298 A1. The oxidation of organic compounds in these patents was effected by the use of cerric compounds such as cerric methanesulfonate and cerric trifluoromethanesulfonate. In all cases, oxidation was complete by only using cerium ion in its highest oxidation state, $Ce^{+4}$. The cerrous ($Ce^{+3}$)/cerric ($Ce^{+4}$) concentrations in MSA are critical in maintaining a stable oxidizing environment. The concentration of cerium discussed in U.S. Pat. No. 4,639,298 is at least 0.2 M but it does not differentiate between $Ce^{+3}$ and $Ce^{+4}$. Only the $Ce^{+4}$ ion is an oxidant and necessary in the MSA solution to effect the oxidation reaction. The concentration of free MSA is also important to assist in dissolving the cerium compounds and the preferred concentrations of free MSA are from 1.5 M to about 9.0 M.

Thus, a new energy storage device based on zinc and cerium salts in a sulfonic acid electrolyte leads to many challenges. A cathodic reaction of zinc ion to zinc metal must be balanced by the oxidation of cerrous ion to cerric ion:

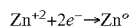

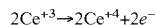

For every mole of zinc ion reduced at the cathode, two moles of cerric ion are produced at the anode. Additional free acid is necessary in this process to impart conductivity to the redox system and thus lower the required voltage. However, as discussed in EP 0786539 A2, the pH for zinc deposition should be greater than 2.0 and preferably from 3-5. The concentration of zinc ion should also be high to achieve commercially acceptable deposition rates and smooth zinc coatings. Kreh and co-workers in U.S. Pat. No. 4,639,298 A1 discuss the use of high free sulfonic acid concentrations, greater than 1.5 M and preferably greater than 3.0 M. This high free sulfonic acid concentration necessary for cerium solubility, would result in a low pH, <1.0, and thus affect the zinc deposition process. The high free sulfonic acid concentration also affects the solubility ratio of $Ce^{+3}/Ce^{+4}$.

It thus would be desirable to have new electrochemical energy storage devices that contain compositions based on zinc and lanthanide series salts in sulfonic acids that produce high deposition efficiencies for zinc ion to zinc metal, free sulfonic acid to impart sufficient conductivity for the redox battery yet maintain high solubility of lanthanide series ion in solution to complete the redox couple.

It would be particularly desirable to have new sulfonic acid compositions that can be effectively used with metals of strong reducing capabilities such as zinc without deleterious effects such as odor often produced when using sulfonic acids containing impurities capable of producing odor.

SUMMARY OF THE INVENTION

It has now been found that an new high energy, highly efficient electrical energy storage device is possible when using metal salts preferably of 2B series metal such as zinc and lanthanide series such as cerium in high purity sulfonic acids. This work focuses on the unexpected superiority of using high purity sulfonic acids with limited free acid concentration of the sulfonic acid concentration to effectively dissolve zinc ion and lanthanide series ion.

Electrolytes of the invention are characterized in significant part by comprising a low concentration of free sulfonic acid, <300 g/l. The low free sulfonic acid concentration allows for high cathode efficiency for zinc deposition yet is sufficient for solution conductivity. The low free sulfonic acid concentration also allows for increased solubility of lanthanide series ions.

Electrolytes of the invention are characterized in significant part by comprising a low concentration of lanthanide series ion concentration that may precipitate from highly concentrated sulfonic acid electrolytes.

Sulfonic acid electrolytes of the invention are also characterized in significant part by comprising a low concentration of reduced sulfur compounds or sulfur compounds in a higher oxidation state that are susceptible to reduction, by either an active metal or during electrolysis, to low valent sulfur compounds (odor-causing impurities) such as sulfides, i.e. high purity. In particular, preferred electrochemical compositions of the invention have a low concentration of dimethyldisulfide, DMDS, ($CH_3SSCH_3$), dimethylsulfide, DMS, ($CH_3SCH_3$), dimethylsulfone, $DMSO_2$, ($CH_3SO_2CH_3$), trichloromethyl methylsulfone, TCMS, ($CH_3SO_2CCl_3$), dichloromethyl methylsulfone, DCMS, ($CH_3SO_2CHCl_2$), methyl methanethiosulfonate, MMTS, ($CH_3SO_2SCH_3$), and methyl methanesulfonate, MMS ($CH_3SO_3CH_3$).

In particular, preferred high purity sulfonic acids of the invention have a total concentration of reduced sulfur compounds less than about 50 mg/liter, more preferably a total concentration of less than 10 mg/liter, still more preferably less than 5 mg/liter.

The invention also includes articles of manufacture employing sulfonic acids of this invention, including batteries and other energy storage devices.

DETAILED DESCRIPTION OF THE INVENTION

Compositions of the invention suitably contain a metal ion in a sulfonic acid electrolyte that is capable of being electrochemically reduced to its metallic state, a metal or metals that are in an oxidized state that are incapable of being reduced to its metallic state, free sulfonic acid of high purity and optionally additives to enhance the zinc deposition reaction or increase the conductivity of the redox cell. The metal ions are preferably added as metal salts of high purity sulfonic acid.

As discussed above, electrolytes of the invention are particularly effective in depositing 2B (series 2B of the Periodic Table) metal ion such as zinc ion from a sulfonic acid solution yet maintain a high lanthanide series (the lanthanide series of the Periodic Table) ion concentration. In particular, sulfonic acid solutions of the invention are useful in energy storage devices such as batteries.

Electrolytes of the invention generally comprise at least one soluble 2B metal salt, preferably zinc salt, one or more soluble lanthanide, preferably cerium, sulfonic acid salts, a high purity acid electrolyte, optionally a buffering agent and optionally conductivity salts. More particularly, electrolyte compositions of the invention preferably contain a zinc salt of a high purity alkyl or aryl sulfonic acid; a lanthanide salt of a high purity alkyl or aryl sulfonic acid; a high purity sulfonic acid electrolyte, preferably an acidic aqueous solution such as a high purity alkyl or aryl sulfonic acid; optionally a buffering agent based on boric acid; optionally conductivity salts with the anionic portion of the salt based on a high purity alkyl or aryl sulfonic acid.

Zinc metal or a variety of zinc salts may also be in the zinc-lanthanide electrolyte. Zinc sulfonate salts may be employed in the subject solutions wherein the sulfonic acid of the anionic portion of the zinc salt and any free acid are introduced as a high purity alkyl or aryl sulfonic acid of formula:

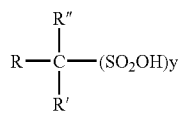

wherein R, R' and R" are the same or different and each independently may be hydrogen, phenyl, Cl, F, Br, I, $CF_3$ or a lower alkyl group such as $(CH_2)n$ where n is from 1 to 7 and that is unsubstituted or substituted by oxygen, Cl, F, Br, I, $CF_3$, —$SO_2OH$. Preferred alkyl sulfonic acids are methanesulfonic, ethanesulfonic and propanesulfonic acids and preferred alkyl polysulfonic acids are methanedisulfonic acid, monochloromethanedisulfonic acid, dichloromethanedisulfonic acid, 1,1-ethanedisulfonic acid, 2-chloro-1,1-ethanedisulfonic acid, 1,2-dichloro-1,1-ethanedisulfonic acid, 1,1-propanedisulfonic acid, 3-chloro-1,1-propanedisulfonic acid, 1,2-ethylene disulfonic acid, 1,3-propylene disulfonic acid, trifluoromethanesulfonic acid, butanesulfonic acid, perfluorobutanesulfonic acid, pentanesulfonic, and the aryl sulfonic acids are phenylsulfonic, phenolsulfonic, paratoulenesulfonic, and xylenesulfonic acids. Zinc methanesulfonate is a particularly preferred zinc salt.

The zinc salt may be suitably present in a relatively wide concentration range in the electrolyte composition of the invention. Preferably, a zinc salt will be employed at a concentration from about 5 to about 500 grams per liter of solution, more preferably at a concentration of from about 20 to about 400 grams per liter of the solution, still more preferably at a concentration of from about 40 to about 300 grams per liter of solution.

A variety of lanthanide salts such as cerium salts may also be in the electrolyte. Lanthanide series sulfonate salts may be employed in the subject solutions wherein the sulfonic acid of the anionic portion of the lanthanide series salt and any free acid are introduced as a high purity alkyl or aryl sulfonic acid of formula:

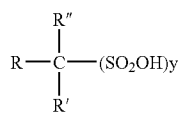

wherein R, R' and R" are the same or different and each independently may be hydrogen, phenyl, Cl, F, Br, I, $CF_3$ or a lower alkyl group such as $(CH_2)n$ where n is from 1 to 7 and that is unsubstituted or substituted by oxygen, Cl, F, Br, I, $CF_3$, —$SO_2OH$. Preferred alkyl sulfonic acid are methanesulfonic, ethanesulfonic and propanesulfonic acids and preferred alkyl polysulfonic acids are methanedisulfonic acid, monochloromethanedisulfonic acid, dichloromethanedisulfonic acid, 1,1-ethanedisulfonic acid, 2-chloro-1,1-ethanedisulfonic acid, 1,2-dichloro-1,1-ethanedisulfonic acid, 1,1-propanedisulfonic acid, 3-chloro-1,1-propanedisulfonic acid 1,2-ethylene disulfonic acid, 1,3-propylene disulfonic acid, trifluoromethanesulfonic acid, butanesulfonic acid, perfluorobutanesulfonic acid, pentanesulfonic, and the aryl sulfonic acids are phenylsulfonic, phenolsulfonic, paratoulenesulfonic, and xylenesulfonic acids. Cerrous methanesulfonate and cerric methanesulfonate are a particularly preferred lanthanide salts.

The preferred lanthanide series acid salt is cerium sulfonic acid salt and is suitably present in a relatively narrow concentration range in the electrolyte of the invention. The individual concentrations of $Ce^{+3}$ and $Ce^{+4}$ are governed by the concentration of free acid in the solution.

Preferably, a cerrous sulfonic acid salt will be employed at a concentration from about 5 to about 800 grams per liter of solution, more preferably at a concentration of from about 20 to about 600 grams per liter of solution, still more preferably at a concentration of from about 50 to about 300 grams per liter of solution.

A cerric sulfonic acid salt will be employed at a concentration from about 0.1 to about 100 grams per liter of solution, more preferably at a concentration of from about 0.5 to about 50 grams per liter of solution, still more preferably at a concentration of from about 1 to about 25 grams per liter of solution.

The electrolyte may also contain high purity free sulfonic acid to increase solution conductivity. The preferred high purity free sulfonic acid has the same anion as the zinc and lanthanide series salt anion but mixtures of high purity free sulfonic acids are also within the scope of this invention. Preferred alkyl sulfonic acid are methanesulfonic, ethanesulfonic and propanesulfonic acids and preferred alkyl polysulfonic acids are methanedisulfonic acid, monochloromethanedisulfonic acid, dichloromethanedisulfonic acid, 1,1-ethanedisulfonic acid, 2-chloro-1,1-ethanedisulfonic acid, 1,2-dichloro-1,1-ethanedisulfonic acid, 1,1-propanedisulfonic acid, 3-chloro-1,1-propanedisulfonic acid, 1,2-ethylene disulfonic acid, 1,3-propylene disulfonic acid, trifluoromethanesulfonic acid, butanesulfonic acid, perfluorobutanesulfonic acid, pentanesulfonic acid and the aryl sulfonic acids are phenylsulfonic, phenolsulfonic, paratoulenesulfonic, and xylenesulfonic acids. The free acid concentration ranges from about 1 to about 1480 grams per liter, more preferably from about 10 to about 1200 grams per liter, still more preferably from about 30 to about 300 grams per liter. The pH of the electrolyte can vary between about 0.5 and 4 and more preferably between about 2 and 3.

The buffering agents, if used, in the electrolyte solution can include boric acid and/or tetraborate. The electrolyte solution containing the buffering agents operate best at lower free acid concentrations, less than 300 grams per liter free acid and produce a smoother zinc coating compared to un-buffered electrolyte solutions. The concentration of the buffering agent can range from about 0.1 g/l to saturation, more preferably from about 1 g/l to about 75 g/l, still more preferably from about 5 g/l to about 50 g/l.

Conductivity salts, if used, in the electrolyte solution can include ammonium ions.

Sulfonic acid electrolytes of the invention are preferably employed at or above room temperature, e.g. up to and somewhat above 85° C. The sulfonic acid solution may be agitated during use such as by using an air sparger, physical movement of the work piece, impingement or other suitable methods.

Electrolysis is preferably conducted at a current ranging from 0.01 to 150 ampere per $dm^2$ ($A/dm^2$) depending upon the energy storage demand.

The invention described also includes the use of direct, pulse or periodic current waveforms to effectively deposit a zinc layer on the cathode substrate.

A wide variety of substrates may be plated with zinc of the invention, as discussed above. The substrates include but are not limited to: carbon, steel, copper, aluminum or alloys of these metals.

The foregoing description of the invention is merely illustrative thereof, and it is understood that variations and modifications can be effected without departing from the scope or spirit of the invention as set forth in the following claims.

EXAMPLES

Example 1

This example shows the effects of free methanesulfonic acid on the conductivity of a solution containing low zinc ion concentration. Solutions of $Zn(CH_3SO_3)_2$ were prepared at a constant 32.5 gram per liter (g/l) $Zn^{+2}$ concentration and free $CH_3SO_3H$ varying from 0 to 300 g/l. Each solution was heated to 65° C. and the conductivity recorded in mS/cm as shown in the following table.

|  | 32.5 g/l $Zn^{++}$, 0 g/l $CH_3SO_3H$ | 32.5 g/l, $Zn^{++}$, 100 g/l $CH_3SO_3H$ | 32.5 g/l $Zn^{++}$, 200 g/l $CH_3SO_3H$ | 32.5 g/l $Zn^{++}$, 300 g/l $CH_3SO_3H$ |
|---|---|---|---|---|
| 20° C. | 40.2 | 231 | 337 | 366 |
| 25° C. | 41.3 | 226 | 331 | 362 |
| 30° C. | 41.4 | 220 | 324 | 355 |
| 35° C. | 44.1 | 210 | 316 | 350 |
| 40° C. | 46.2 | 214 | 308 | 342 |
| 45° C. | 49.9 | 201 | 302 | 338 |
| 50° C. | 54.6 | 194.8 | 296 | 330 |
| 55° C. | 60.1 | 190 | 291 | 323 |
| 60° C. | 65.2 | 185.1 | 287 | 313 |
| 65° C. | 70.2 | 180.5 | 282 | 308 |

The data shows an increase in conductivity with temperature for the zinc ion solution containing no free acid but a decrease in conductivity in solutions containing 100-300 g/l free acid. There is an increase in conductivity with free acid up to 300 g/l. The increase in conductivity is large when going from 0 to 100 g/l and from 100 to 200 g/l free acid but there appears to be a diminishing return in conductivity when going from 200 to 300 g/l free acid. Therefore, the zinc acid electrolyte can be operated at 200 g/l free acid, or less, without significant detrimental effects on conductivity.

Example 2

This example shows the effects of free methanesulfonic acid concentration on the cathode efficiency for zinc deposition in solutions containing no lanthanide metals.

|  | 32.5 g/l $Zn^{++}$/0 g/l $CH_3SO_3H$ | 32.5 g/l $Zn^{++}$/100 g/l $CH_3SO_3H$ | 32.5 g/l $Zn^{++}$/200 g/l $CH_3SO_3H$ | 32.5 g/l $Zn^{++}$/300 g/l $CH_3SO_3H$ |
|---|---|---|---|---|
| Original Weight | 8.3981 | 8.2876 | 8.4798 | 8.3211 |
| Final Weight | 8.4874 | 8.3781 | 8.5452 | 8.3702 |
| Cathode Efficiency (30 A/dm$^2$) | 87.91% | 89.09% | 64.38% | 48.34% |
| Appearance | Light Gray | Light Gray | Light Gray | Light Gray |
| Cell Voltage | 2.42 | 1.21 | 0.96 | 0.84 |
| Original Weight | 8.4533 | 8.1982 | 8.2135 | 8.4224 |
| Final Weight | 8.6323 | 8.3891 | 8.3581 | 8.5577 |
| Cathode Efficiency (60 A/dm$^2$) | 88.11% | 93.97% | 71.18% | 66.60% |
| Appearance | Light Gray | Light Gray | Light Gray | Light Gray |
| Cell Voltage | 4.41 | 2.25 | 1.7 | 1.61 |

Solutions of $Zn(CH_3SO_3)_2$ were prepared at a constant 32.5 g/l $Zn^{+2}$ concentration and free $CH_3SO_3H$ varying from 0 to 300 g/l. Each solution was heated to 55° C. and the zinc was deposited on low carbon steel at 30 A/dm$^2$ and 60 A/dm$^2$. The data in the above table shows the cathode efficiency is high and commercially acceptable at 0 and 100 g/l free acid but drops off only slightly at 200 g/l and considerably at 300 g/l free methanesulfonic acid.

Example 3

This example shows the effects of free methanesulfonic acid on the conductivity of a solution containing high zinc ion concentration. Solutions of $Zn(CH_3SO_3)_2$ were prepared at a constant 32.5 g/l $Zn^{+2}$ concentration and free $CH_3SO_3H$ varying from 0 to 500 g/l. Each solution was heated to 65° C. and the conductivity recorded in mS/cm as shown in the following table.

|  | 32.5 g/l Zn++, 0 g/l $CH_3SO_3H$ | 32.5 g/l Zn++, 100 g/l $CH_3SO_3H$ | 32.5 g/l Zn++, 200 g/l $CH_3SO_3H$ | 32.5 g/l Zn++, 300 g/l $CH_3SO_3H$ | 32.5 g/l Zn++, 400 g/l $CH_3SO_3H$ | 32.5 g/l Zn++, 500 g/l $CH_3SO_3H$ |
|---|---|---|---|---|---|---|
| 20° C. | 55.6 | 163.5 | 224 | 219 | 209 | 150.2 |
| 25° C. | 62.7 | 179.2 | 240 | 234 | 210 | 151.1 |
| 30° C. | 69.7 | 199.3 | 260 | 256 | 210 | 159 |
| 35° C. | 76.7 | 212 | 281 | 278 | 214 | 158.3 |
| 40° C. | 83.7 | 227 | 305 | 302 | 218 | 158.1 |
| 45° C. | 91 | 244 | 327 | 323 | 224 | 158.7 |
| 50° C. | 96.4 | 260 | 348 | 346 | 229 | 158.6 |
| 55° C. | 106.2 | 276 | 366 | 374 | 235 | 158.4 |
| 60° C. | 113.1 | 291 | 387 | 391 | 239 | 157.9 |
| 65° C. | 119.4 | 302 | 406 | 409 | 243 | 157.8 |

The data shows an increase in conductivity with temperature for each electrolyte below 400 g/l free MSA, an increase in conductivity with free acid up to 300 g/l then a decrease in conductivity, a larger increase in conductivity going from 0 to 100 g/l free acid compared to an increase in free acid from 100 to 200 g/l or from 200 to 300 g/l. Therefore, the zinc acid electrolyte can be operated at 300 g/l free acid, or less, without significant detrimental effects on conductivity.

Example 4

This example shows the effects of free methanesulfonic acid concentration on the cathode efficiency for zinc deposition in solutions containing high free zinc ion concentration.

Solutions of $Zn(CH_3SO_3)_2$ were prepared at a constant 65 g/l $Zn^{+2}$ concentration and free $CH_3SO_3H$ varying from 0 to 300 g/l. Each solution was heated to 65° C. and the zinc was deposited on low carbon steel at 30 A/dm² and 60 A/dm². The data in the following table shows the cathode efficiency is high and commercially acceptable at 0 and 100 g/l free acid but drops off considerably at 200 and 300 g/l free methanesulfonic acid.

| | 65 g/l $Zn^{++}$/0 g/l $CH_3SO_3H$ | 65 g/l $Zn^{++}$/100 g/l $CH_3SO_3H$ | 65 g/l $Zn^{++}$/200 g/l $CH_3SO_3H$ | 65 g/l $Zn^{++}$/300 g/l $CH_3SO_3H$ |
|---|---|---|---|---|
| Original Weight | 8.4916 | 8.4557 | 8.5237 | 8.192 |
| Final Weight | 8.5882 | 8.5509 | 8.5705 | 8.2044 |
| Cathode Efficiency (30 A/dm²) | 95.10% | 93.72% | 46.07% | 8.55% |
| Appearance | Light Gray | Light Gray | Light Gray | Light Gray |
| Cell Voltage | 2.35 | 1.06 | 0.73 | 0.73 |
| Original Weight | 8.3091 | 8.3626 | 8.2063 | 8.4544 |
| Final Weight | 8.5077 | 8.5555 | 8.348 | 8.4926 |
| Cathode Efficiency (60 A/dm²) | 97.76% | 94.95% | 69.75% | 37.61% |
| Appearance | Light Gray | Light Gray | Light Gray | Light Gray |
| Cell Voltage | 4.22 | 2.05 | 1.57 | 1.52 |

Example 5

This example shows the effects of boric acid concentration and free methanesulfonic acid concentrations on the conductivity of a solution containing zinc ion. Solutions of $Zn(CH_3SO_3)_2$ were prepared at a constant 65 g/l $Zn^{+2}$ concentration and free $CH_3SO_3H$ varying from 0 to 300 g/l. Each solution was heated to 65° C. and the conductivity recorded in mS/cm as shown in the following table.

| | 65 g/l $Zn^{++}$/ 0 g/l $CH_3SO_3H$ + 70 g/l $Ce^{+3}$ + 0 g/l $H_3BO_3$ | 65 g/l $Zn^{++}$/100 g/l $CH_3SO_3H$ + 70 g/l $Ce^{+3}$ + 0 g/l $H_3BO_3$ | 65 g/l $Zn^{++}$/200 g/l $CH_3SO_3H$ + 70 g/l $Ce^{+3}$ + 0 g/l $H_3BO_3$ | 65 g/l $Zn^{++}$/300 g/l $CH_3SO_3H$ + 70 g/l $Ce^{+3}$ + 0 g/l $H_3BO_3$ |
|---|---|---|---|---|
| 20° C. | 81.2 | 141.4 | 156 | 135.1 |
| 25° C. | 90.6 | 158.2 | 169.9 | 150.8 |
| 30° C. | 97.4 | 168.5 | 190.5 | 165.8 |
| 35° C. | 108.6 | 183.5 | 204 | 182.2 |
| 40° C. | 116.1 | 198.2 | 221 | 201 |
| 45° C. | 127.6 | 214 | 238 | 216 |
| 50° C. | 135.4 | 228 | 257 | 234 |
| 55° C. | 147.8 | 242 | 274 | 253 |
| 60° C. | 155.1 | 257 | 293 | 271 |
| 65° C. | 163.1 | 271 | 307 | 288 |

| | 65 g/l $Zn^{++}$/ 0 g/l $CH_3SO_3H$ + 70 g/l $Ce^{+3}$ + 10 g/l $H_3BO_3$ | 65 g/l $Zn^{++}$/100 g/l $CH_3SO_3H$ + 70 g/l $Ce^{+3}$ + 10 g/l $H_3BO_3$ | 65 g/l $Zn^{++}$/200 g/l $CH_3SO_3H$ + 70 g/l $Ce^{+3}$ + 10 g/l $H_3BO_3$ | 65 g/l $Zn^{++}$/300 g/l $CH_3SO_3H$ + 70 g/l $Ce^{+3}$ + 10 g/l $H_3BO_3$ |
|---|---|---|---|---|
| 20° C. | 78.4 | 130.1 | 142.4 | 123.2 |
| 25° C. | 86.5 | 142.1 | 155.2 | 134.5 |
| 30° C. | 95.6 | 156.4 | 171.3 | 148.8 |
| 35° C. | 105.3 | 170.2 | 188.5 | 167.5 |
| 40° C. | 114.6 | 186.4 | 201 | 188.2 |
| 45° C. | 123.1 | 201 | 222 | 201 |
| 50° C. | 131.2 | 216 | 242 | 219 |
| 55° C. | 143.5 | 232 | 258 | 237 |
| 60° C. | 153.9 | 248 | 271 | 259 |
| 65° C. | 165.1 | 262 | 287 | 274 |

-continued

|  | 65 g/l Zn$^{++}$/ 0 g/l CH$_3$SO$_3$H + 70 g/l Ce$^{+3}$ + 25 g/l H$_3$BO$_3$ | 65 g/l Zn$^{++}$/100 g/l CH$_3$SO$_3$H + 70 g/l Ce$^{+3}$ + 25 g/l H$_3$BO$_3$ | 65 g/l Zn$^{++}$/200 g/l CH$_3$SO$_3$H + 70 g/l Ce$^{+3}$ + 25 g/l H$_3$BO$_3$ | 65 g/l Zn$^{++}$/300 g/l CH$_3$SO$_3$H + 70 g/l Ce$^{+3}$ + 25 g/l H$_3$BO$_3$ |
|---|---|---|---|---|
| 20° C. | 79.2 | 121.5 | 133.4 | 113.6 |
| 25° C. | 85.6 | 131.3 | 143.2 | 121.2 |
| 30° C. | 92.7 | 145.1 | 154.6 | 132.5 |
| 35° C. | 101.2 | 152.5 | 171.8 | 149.2 |
| 40° C. | 110.7 | 172.1 | 187.4 | 163.2 |
| 45° C. | 119.3 | 180.2 | 202 | 177.2 |
| 50° C. | 128.5 | 196.4 | 217 | 193.2 |
| 55° C. | 137.8 | 214 | 238 | 211 |
| 60° C. | 148.1 | 234 | 270 | 234 |
| 65° C. | 158.6 | 251 | 284 | 255 |

|  | 65 g/l Zn$^{++}$/ 0 g/l CH$_3$SO$_3$H + 70 g/l Ce$^{+3}$ + 50 g/l H$_3$BO$_3$ | 65 g/l Zn$^{++}$/100 g/l CH$_3$SO$_3$H + 70 g/l Ce$^{+3}$ + 50 g/l H$_3$BO$_3$ | 65 g/l Zn$^{++}$/200 g/l CH$_3$SO$_3$H + 70 g/l Ce$^{+3}$ + 50 g/l H$_3$BO$_3$ | 65 g/l Zn$^{++}$/300 g/l CH$_3$SO$_3$H + 70 g/l Ce$^{+3}$ + 50 g/l H$_3$BO$_3$ |
|---|---|---|---|---|
| 20° C. | 74.2 | 110.3 | 114.1 | 98.4 |
| 25° C. | 81.2 | 120.7 | 120.2 | 107.1 |
| 30° C. | 88.7 | 132.3 | 135.1 | 119.4 |
| 35° C. | 95.8 | 145.1 | 147.1 | 133.7 |
| 40° C. | 104.2 | 156.5 | 161.6 | 145.5 |
| 45° C. | 111.9 | 167.2 | 173.9 | 157.1 |
| 50° C. | 120.8 | 179.8 | 189.3 | 169.1 |
| 55° C. | 130.1 | 193.8 | 205 | 183.1 |
| 60° C. | 138.1 | 214 | 226 | 201 |
| 65° C. | 147.9 | 223 | 242 | 220 |

The boric acid had a small effect on the conductivity particularly at the lower boric acid concentrations.

Example 6

This example shows the effects of boric acid and free methanesulfonic acid concentrations on the cathode efficiency for zinc deposition in solutions containing high free zinc ion concentration.

Solutions of Zn(CH$_3$SO$_3$)$_2$ were prepared at a constant 65 g/l Zn$^{+2}$ concentration and 20 g/l boric acid was added and free CH$_3$SO$_3$H varying from 0 to 300 g/l N. Each solution was heated to 65° C. and the zinc was deposited on low carbon steel at 30 A/dm$^2$ and 60 A/dm$^2$. The data in the following table shows the cathode efficiency is high even at 300 g/l free methanesulfonic acid.

Example 7

This example shows the effects of trifluoromethanesulfonate, lithium salt, concentration and free methanesulfonic acid concentrations on the conductivity of a solution containing zinc ion. Solutions of Zn(CH$_3$SO$_3$)$_2$ were prepared at a constant 65 g/l Zn$^{+2}$ concentration and free CH$_3$SO$_3$H varying from 0 to 300 g/l. Each solution was heated to 65° C. and the conductivity recorded in mS/cm as shown in the following table.

|  | 65 g/l Zn$^{++}$/ 0 g/l CH$_3$SO$_3$H | 65 g/l Zn$^{++}$/100 g/l CH$_3$SO$_3$H/20 g/l H$_3$BO$_3$ | 65 g/l Zn$^{++}$/200 g/l CH$_3$SO$_3$H/20 g/l H$_3$BO$_3$ | 65 g/l Zn$^{++}$/300 g/l CH$_3$SO$_3$H/20 g/l H$_3$BO$_3$ |
|---|---|---|---|---|
| Original Weight | 8.6218 | 8.4511 | 8.3278 | 8.4332 |
| Final Weight | 8.7721 | 8.5513 | 8.4133 | 8.5171 |
| Cathode Efficiency (30 A/dm$^2$) | 98.74% | 98.64% | 84.17% | 82.60% |
| Appearance | Light Gray | Light Gray | Light Gray | Light Gray |
| Cell Voltage | 2.38 | 1.24 | 1.01 | 0.9 |
| Original Weight | 8.5532 | 8.4611 | 8.3298 | 8.5475 |
| Final Weight | 8.7351 | 8.6512 | 8.5131 | 8.7181 |
| Cathode Efficiency (60 A/dm$^2$) | 89.54% | 93.57% | 90.23% | 83.97% |
| Appearance | Light Gray | Light Gray | Light Gray | Light Gray |
| Cell Voltage | 4.25 | 2.22 | 1.7 | 1.64 |

| | 65 g/l Zn$^{++}$/ 0 g/l CH$_3$SO$_3$H + 70 g/l Ce$^{+3}$ + 14 g/l Ce$^{+4}$ + 0 g/l LiCF$_3$SO$_3$ | 65 g/l Zn$^{++}$/100 g/l CH$_3$SO$_3$H + 70 g/l Ce$^{+3}$ + 14 g/l Ce$^{+4}$ + 0 g/l LiCF$_3$SO$_3$ | 65 g/l Zn$^{++}$/200 g/l CH$_3$SO$_3$H + 70 g/l Ce$^{+3}$ + 14 g/l Ce$^{+4}$ + 0 g/l LiCF$_3$SO$_3$ | 65 g/l Zn$^{++}$/300 g/l CH$_3$SO$_3$H + 70 g/l Ce$^{+3}$ + 14 g/l Ce$^{+4}$ + 0 g/l LiCF$_3$SO$_3$ |
|---|---|---|---|---|
| 20° C. | 83.7 | 140.2 | 159.2 | 138.8 |
| 25° C. | 91.7 | 156.2 | 176.6 | 156.5 |
| 30° C. | 101.4 | 171.4 | 194.1 | 174.5 |
| 35° C. | 110.9 | 190 | 216 | 188.1 |
| 40° C. | 120.2 | 203 | 230 | 205 |
| 45° C. | 129.6 | 218 | 250 | 225 |
| 50° C. | 139.8 | 235 | 270 | 240 |
| 55° C. | 149 | 250 | 285 | 258 |
| 60° C. | 159.2 | 264 | 304 | 277 |
| 65° C. | 170 | 278 | 319 | 295 |

| | 65 g/l Zn$^{++}$/ 0 g/l CH$_3$SO$_3$H + 70 g/l Ce$^{+3}$ + 14 g/l Ce$^{+4}$ + 10 g/l LiCF$_3$SO$_3$ | 65 g/l Zn$^{++}$/100 g/l CH$_3$SO$_3$H + 70 g/l Ce$^{+3}$ + 14 g/l Ce$^{+4}$ + 10 g/l LiCF$_3$SO$_3$ | 65 g/l Zn$^{++}$/200 g/l CH$_3$SO$_3$H + 70 g/l Ce$^{+3}$ + 14 g/l Ce$^{+4}$ + 10 g/l LiCF$_3$SO$_3$ | 65 g/l Zn$^{++}$/300 g/l CH$_3$SO$_3$H + 70 g/l Ce$^{+3}$ + 14 g/l Ce$^{+4}$ + 10 g/l LiCF$_3$SO$_3$ |
|---|---|---|---|---|
| 20° C. | 76.2 | 135 | 140.2 | 135.4 |
| 25° C. | 84.7 | 149.3 | 152.4 | 148.9 |
| 30° C. | 94 | 165.2 | 170.2 | 161.1 |
| 35° C. | 104.2 | 179.8 | 183.5 | 179.4 |
| 40° C. | 112.2 | 195.8 | 199.7 | 196.1 |
| 45° C. | 121.6 | 212 | 219 | 214 |
| 50° C. | 131.1 | 228 | 238 | 233 |
| 55° C. | 140.5 | 244 | 259 | 253 |
| 60° C. | 151 | 258 | 275 | 270 |
| 65° C. | 162.2 | 275 | 295 | 287 |

| | 65 g/l Zn$^{++}$/ 0 g/l CH$_3$SO$_3$H + 70 g/l Ce$^{+3}$ + 014 g/l Ce$^{+4}$ + 25 g/l LiCF$_3$SO$_3$ | 65 g/l Zn$^{++}$/100 g/l CH$_3$SO$_3$H + 70 g/l Ce$^{+3}$ + 14 g/l Ce$^{+4}$ + 25 g/l LiCF$_3$SO$_3$ | 65 g/l Zn$^{++}$/200 g/l CH$_3$SO$_3$H + 70 g/l Ce$^{+3}$ + 14 g/l Ce$^{+4}$ + 25 g/l LiCF$_3$SO$_3$ | 65 g/l Zn$^{++}$/300 g/l CH$_3$SO$_3$H + 70 g/l Ce$^{+3}$ + 14 g/l Ce$^{+4}$ + 25 g/l LiCF$_3$SO$_3$ |
|---|---|---|---|---|
| 20° C. | 76.2 | 129.2 | 138.1 | 129.4 |
| 25° C. | 84.2 | 141.2 | 152.3 | 142.2 |
| 30° C. | 91.1 | 156.6 | 165 | 158.3 |
| 35° C. | 101.1 | 174.2 | 181 | 173 |
| 40° C. | 109.8 | 189.2 | 197.5 | 191.3 |
| 45° C. | 119.7 | 194.5 | 215 | 208 |
| 50° C. | 129.7 | 216 | 232 | 225 |
| 55° C. | 138.9 | 232 | 250 | 241 |
| 60° C. | 149.8 | 249 | 273 | 259 |
| 65° C. | 160.2 | 263 | 287 | 275 |

| | 65 g/l Zn$^{++}$/ 0 N CH$_3$SO$_3$H + 70 g/l Ce$^{+3}$ + 14 g/l Ce$^{+4}$ + 50 g/l LiCF$_3$SO$_3$ | 65 g/l Zn$^{++}$/ 1 N CH$_3$SO$_3$H + 70 g/l Ce$^{+3}$ + 14 g/l Ce$^{+4}$ + 50 g/l LiCF$_3$SO$_3$ | 65 g/l Zn$^{++}$/ 2 N CH$_3$SO$_3$H + 70 g/l Ce$^{+3}$ + 14 g/l Ce$^{+4}$ + 50 g/l LiCF$_3$SO$_3$ | 65 g/l Zn$^{++}$/ 3 N CH$_3$SO$_3$H + 70 g/l Ce$^{+3}$ + 14 g/l Ce$^{+4}$ + 50 g/l LiCF$_3$SO$_3$ |
|---|---|---|---|---|
| 20° C. | 73.2 | 116.3 | 129.2 | 112.4 |
| 25° C. | 82.2 | 129.2 | 145.4 | 124 |
| 30° C. | 90.6 | 141.2 | 162.1 | 131 |
| 35° C. | 105.3 | 154.6 | 181.2 | 154.2 |
| 40° C. | 109.2 | 169.8 | 196 | 171.2 |
| 45° C. | 120.8 | 185.4 | 211 | 187 |
| 50° C. | 130.7 | 201 | 227 | 202 |
| 55° C. | 140.4 | 216 | 244 | 218 |
| 60° C. | 151.8 | 233 | 260 | 236 |
| 65° C. | 160.8 | 248 | 275 | 254 |

The lithium trifluoromethanesulfonate salt had a small effect on the conductivity particularly at the lower concentrations.

Example 8

This example shows the effects of free methanesulfonic acid concentration on the cathode efficiency for zinc deposition with Ce$^{+3}$ ions present.

Solution of Zn(CH$_3$SO$_3$)$_2$ were prepared at a constant 65 g/l Zn$^{+2}$ and 70 g/l Ce$^{+3}$ (added as the methanesulfonate salt) concentrations and free CH$_3$SO$_3$H varying from 0 to 300 g/l N. Each solution was heated to 65° C. and the zinc was deposited on low carbon steel at 30 A/dm$^2$ and 60 A/dm$^2$. The data in the following table shows the cathode efficiency is high and commercially acceptable at 0 and 100 g/l free acid and high current density but drops off considerably at 200 and 300 g/l free methanesulfonic acid.

|  | 65 g/l Zn$^{++}$/ 0 N CH$_3$SO$_3$H + 70 g/l Ce$^{+3}$ | 65 g/l Zn$^{++}$/ 1 N CH$_3$SO$_3$H + 70 g/l Ce$^{+3}$ | 65 g/l Zn$^{++}$/ 2 N CH$_3$SO$_3$H + 70 g/l Ce$^{+3}$ | 65 g/l Zn$^{++}$/ 3 N CH$_3$SO$_3$H + 70 g/l Ce$^{+3}$ |
|---|---|---|---|---|
| Original Weight | 8.293 | 8.7048 | 8.6407 | 8.6837 |
| Final Weight | 8.3877 | 8.7702 | 8.6967 | 8.6971 |
| Cathode Efficiency (30 A/dm$^2$) | 93.23% | 64.38% | 55.13% | 26.38% |
| Appearance | Light Gray | Light Gray | Light Gray | Light Gray |
| Cell Voltage | 1.74 | 1.26 | 0.71 | 0.83 |
| Original Weight | 8.5111 | 8.0504 | 8.435 | 8.1435 |
| Final Weight | 8.7113 | 8.2337 | 8.5739 | 8.1937 |
| Cathode Efficiency (60 A/dm$^2$) | 98.54% | 90.23% | 68.37% | 49.42% |
| Appearance | Light Gray | Light Gray | Light Gray | Light Gray |
| Cell Voltage | 3.26 | 2.24 | 1.76 | 2.28 |

Example 9

This example shows the effects of free methanesulfonic acid concentration on the cathode efficiency for zinc deposition with Ce$^{+3}$ and Ce$^{+4}$ ions present.

Solution of Zn(CH$_3$SO$_3$)$_2$ were prepared at a constant 65 g/l Zn$^{+2}$ and 70 g/l Ce+3 and 0.1 M Ce$^{+4}$ (added as the methanesulfonate salts) concentrations and free CH$_3$SO$_3$H varying from 0 to 300 g/l. Each solution was heated to 65° C. and the zinc was deposited on low carbon steel at 30 A/dm$^2$ and 60 A/dm$^2$. The data in the following table shows the cathode efficiency is high and commercially acceptable at 0 and 100 g/l free acid and low or high current densities but drops off considerably at 200 and 300 g/l free methanesulfonic acid.

The solubility of Ce$^{+4}$ is less as the concentration of free MSA increases. To minimize cerric ion precipitation in an energy storage device and possibly clogging of membranes, separators, and porous electrodes, it is advisable to operate the Zn—Ce cell with low free MSA and low Ce$^{+4}$ concentration.

Example 11

This example shows the effects of cerric salt solubility in low concentrations of methanesulfonic acid. Aqueous solutions were prepared containing 65 g/l Zn$^{+2}$ and 70 g/l Ce$^{+3}$ from their corresponding methanesulfonate salts. Cerric

|  | 65 g/l Zn$^{++}$/0 g/l CH$_3$SO$_3$H + 70 g/l Ce$^{+3}$ + 14 g/l Ce$^{+4}$ | 65 g/l Zn$^{++}$/100 g/l CH$_3$SO$_3$H + 70 g/l Ce$^{+3}$ + 14 g/l Ce$^{+4}$ | 65 g/l Zn$^{++}$/200 g/l CH$_3$SO$_3$H + 70 g/l Ce$^{+3}$ + 14 g/l Ce$^{+4}$ | 65 g/l Zn$^{++}$/300 g/l CH$_3$SO$_3$H + 70 g/l Ce$^{+3}$ + 14 g/l Ce$^{+4}$ |
|---|---|---|---|---|
| Original Weight | 8.7301 | 8.6603 | 8.1086 | 8.3527 |
| Final Weight | 8.8215 | 8.7471 | 8.1695 | 8.3627 |
| Cathode Efficiency (30 A/dm$^2$) | 89.98% | 85.45% | 59.95% | 19.69% |
| Appearance | Light Gray | Light Gray | Light Gray | Light Gray |
| Cell Voltage | 1.73 | 1.42 | 1.23 | 1.68 |
| Original Weight | 8.0713 | 8.1279 | 8.5645 | 8.5081 |
| Final Weight | 8.2684 | 8.3174 | 8.6992 | 8.55 |
| Cathode Efficiency (60 A/dm$^2$) | 97.02% | 93.28% | 66.30% | 41.25% |
| Appearance | Light Gray | Light Gray | Light Gray | Light Gray |
| Cell Voltage | 3.57 | 2.88 | 2.21 | 2.7 |

Example 10

This example shows the effects of cerric salt solubility in varying concentrations of methanesulfonic acid. Aqueous solutions were prepared containing 65 g/l Zn$^{+2}$ and 70 g/l Ce$^{+3}$ from their corresponding methanesulfonate salts. Cerric methanesulfonate was added incrementally and allowed to dissolve for at least 24 hours. A yellow precipitate marked the onset of Ce$^{+4}$ saturation.

|  | Free CH$_3$SO$_3$H: 100 g/l | Free CH$_3$SO$_3$H: 200 g/l | Free CH$_3$SO$_3$H: 300 g/l |
|---|---|---|---|
| Total Soluble Ce$^{+4}$ (g/l) | 54.79 | 20.87 | 4.06 |
| Total Soluble Ce$^{+4}$ (M) | 0.391 | 0.149 | 0.029 | methanesulfonate was added incrementally and allowed to dissolve for at least 24 hours. A yellow precipitate marked the onset of Ce$^{+4}$ saturation.

|  | Free CH$_3$SO$_3$H: 25 g/l | Free CH$_3$SO$_3$H: 50 g/l | Free CH$_3$SO$_3$H: 75 g/l |
|---|---|---|---|
| Total Soluble Ce$^{+4}$ (g/l) | 59.97 | 55.21 | 50.16 |
| Total Soluble Ce$^{+4}$ (M) | 0.428 | 0.394 | 0.358 |

Example 12

This example shows the effects of trace impurities on producing an unwanted odor during the dissolution of active metals. Zinc metal was dissolved into purified 70% MSA until the zinc ion concentration was 65 g/l. No odor was detected during the dissolution of zinc metal. Zinc metal was also dissolved into 70% MSA containing 10 mg/l of methyl methanethiosulfonate, MMTS, (CH$_3$SO$_2$SCH$_3$). During dissolution, a pungent odor was detected.

What is claimed:

1. An aqueous solution for an electrochemical energy storage device which comprises (a) a high purity sulfonic acid with a low concentration of low valent sulfur compounds or higher valent sulfur compounds susceptible to reduction comprising a sum total concentration of dimethyldisulfide (CH$_3$SSCH$_3$), dimethylsulfide (CH$_3$SCH$_3$), dimethylsulfone (CH$_3$SO$_2$CH$_3$), trichloromethyl methylsulfone (CH$_3$SO$_2$CCl$_3$), dichloromethyl methylsulfone (CH$_3$SO$_2$CHCl$_2$), methyl methanethiosulfonate (CH$_3$SO$_2$SCH$_3$), and methyl methanesulfonate (CH$_3$SO$_3$CH$_3$) of less than about 50 mg/l, (b) a metal or metals in an oxidized state capable of being reduced to the zero valent oxidation state, (c) a metal that is in an oxidized state that is incapable of being reduced to its metallic state, and optionally (d) a buffering agent and optionally (e) conductivity salts.

2. The solution of claim 1 wherein said high purity sulfonic acid is derived from an alkyl monosulfonic acid, an alkyl polysulfonic acid, an aryl mono or polysulfonic acid or mixture thereof.

3. The solution of claim 1 wherein said high purity sulfonic acid is introduced as:

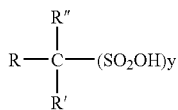

wherein R, R' and R" are the same or different and each independently may be hydrogen, phenyl, Cl, F, Br, I, CF$_3$ or a lower alkyl group such as (CH$_2$)n where n is from 1 to 7 and that is unsubstituted or substituted by oxygen, Cl, F, Br, I, CF$_3$, —SO$_2$OH.

4. The solution of claim 1 wherein the sulfonic acid is methanesulfonic acid, ethanesulfonic acid, propanesulfonic acid, methanedisulfonic acid, monochloromethanedisulfonic acid, dichloromethanedisulfonic acid, 1,1-ethanedisulfonic acid, 2-chloro-1,1-ethanedisulfonic acid, 1,2-dichloro-1,1-ethanedisulfonic acid, 1,1-propanedisulfonic acid, 3-chloro-1,1-propanedisulfonic acid, 1,2-ethylene disulfonic acid, 1,3-propylene disulfonic acid, trifluoromethanesulfonic acid, butanesulfonic acid, perfluorobutanesulfonic acid, pentanesulfonic acid, phenyl sulfonicacid, phenolsulfonic acid, para-toulenesulfonic acid, and xylenesulfonic acid or mixtures thereof.

5. The solution of claim 1 wherein said high purity sulfonic acid has a concentration of from about 1 to 1480 grams per liter of solution.

6. The solution of claim 1 wherein said high purity sulfonic acid has a concentration of from about 10 to about 1200 grams per liter of solution.

7. The solution of claim 1 wherein said high purity sulfonic acid has a concentration of from about 30 to about 300 grams per liter of solution.

8. The solution of claim 1 wherein the pH is between 0.5 to 4.

9. The solution of claim 1 wherein said high purity sulfonic acid is a mixture of sulfonic acids.

10. The solution of claim 1 wherein said buffering agent is added to modulate the pH of the solution.

11. The solution of claim 10 wherein said buffering agent is boric acid.

12. The solution of claim 1 wherein a conductivity salt is added to the solution.

13. The solution of claim 12 wherein said conductivity salt is an ammonium ion.

14. The solution of claim 1 wherein the metals are introduced as a metal salt of a high purity alkyl or aryl sulfonic acid of formula:

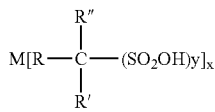

wherein R, R' and R" are the same or different and each independently may be hydrogen, phenyl, Cl, F, Br, I, CF$_3$ or a lower alkyl group such as (CH$_2$)n where n is from 1 to 7 and that is unsubstituted or substituted by oxygen, Cl, F, Br, I, CF$_3$, —SO$_2$OH and x varies from 1 to 4 and M is a metal from the 2B or lanthanide groups of the periodic table.

15. The solution of claim 14 wherein an individual metal salt is employed at a concentration of from about 1 to about 500 grams per liter of solution.

16. The solution of claim 14 wherein an individual metal salt is employed at a concentration of from about 10 to about 400 grams per liter of solution.

17. The solution of claim 14 wherein an individual metal salt is employed at a concentration of from about 30 to about 150 grams per liter of solution.

18. The solution of claim 14 wherein said high purity sulfonic acid is methanesulfonic acid, ethanesulfonic acid, propanesulfonic acid, trifluoromethanesulfonic acid or mixtures thereof.

19. The solution of claim 14 wherein the metal sulfonic acid salt is zinc methanesulfonate.

20. The solution of claim 14 wherein the metal sulfonic acid salt is cerrous methanesulfonate.

21. The solution of claim 14 wherein the metal sulfonic acid salt is cerric methanesulfonate.

22. The solution of claim 14 wherein the metal alkanesulfonic acid salt is vanadium methanesulfonate.

23. A process of making metal-sulfonate solutions by dissolving pure metal, metal carbonate, metal oxide or other metal salts into a high purity sulfonic acid according to claim 1 wherein the metal ion concentration varies from about 1 g/l to about 150 g/l.

24. A process for the deposition of a metal from the solution of claim 1 comprising passing an electric current through the solution to electroplate a metal or a metal alloy unto a substrate.

25. The process of claim 24 wherein the substrate is an inert electrode of steel, copper or copper-alloy, nickel or nickel-alloy, cobalt or cobalt alloy, a refractory metal or oxide, carbon or an organic substrate.

26. The process of claim 25 wherein the high purity sulfonic acid is methanesulfonic acid.

27. The process of claim 24 wherein the solution contains a mixture of sulfonic acids and other inorganic and organic acids.

28. The process of claim 24 wherein direct current, pulsed current or periodic reverse current is used.

29. The process of claim 24 wherein a soluble, insoluble or inert anode is used.

30. The process of claim 24 wherein the temperature of the solution is between about 20° C. to 95° C.

31. The process of claim 24 wherein the metal is pure metal or a metal alloy with a metal from Group 2B, and the lanthanide metals of the periodic table or combinations thereof.

* * * * *